Jan. 17, 1928.  
W. D. KMENTT ET AL  
1,656,330  
AUTOMATIC CLASSIFYING DEVICE  
Filed Nov. 30, 1925  6 Sheets-Sheet 2

Inventors,  
Waldemar D. Kmentt  
Harry E. Waner  
By Pierson, Eakin & Avery  
Attys.

Jan. 17, 1928.  1,656,330
W. D. KMENTT ET AL
AUTOMATIC CLASSIFYING DEVICE
Filed Nov. 30, 1925  6 Sheets-Sheet 4

Fig. 8.

Inventors
Waldemar D. Kmentt
Harry E. Waner
By Pierson, Eaken & Avery
Attys.

Patented Jan. 17, 1928.

1,656,330

UNITED STATES PATENT OFFICE.

WALDEMAR D. KMENTT AND HARRY E. WANER, OF AKRON, OHIO, ASSIGNORS TO THE B. F. GOODRICH COMPANY, OF NEW YORK, N. Y., A CORPORATION OF NEW YORK.

AUTOMATIC CLASSIFYING DEVICE.

Application filed November 30, 1925. Serial No. 72,203.

This invention relates to automatic classifying devices and more particularly to apparatus adapted to weigh successive articles and automatically to sort them into different classes according to their weight, although not wholly limited thereto.

Our general objects are to provide an improved machine adapted rapidly, accurately and dependably to classify or sort a succession of articles. A further object is to obtain a sorting of the articles into a large number of classes in the same, continuous operation of the machine. Another object is to provide for the sorting of articles into classes each having a very short range as to the weight or other characteristic of articles therein. Another object is to provide a machine adapted to weigh and sort rubber-wound golf-ball centers or the like without so roughly treating them as to dislodge the anchored end of the winding. Still further objects are compactness and simplicity of mechanism, facility of removal of the classified articles from the apparatus, and continuous operation of the machine while the articles are supplied thereto and removed therefrom.

*General description.*

Referring to the drawings, the machine comprises a rotary hopper 10 adapted to deliver the articles to be sorted, such as the balls 11, 11, in timed succession, through a stationary chute 12, onto a circular table surface 13ª formed upon a casting 13 which constitutes a part of the framing of the machine, said table surface being surrounded by an upstanding flange 14 to retain the balls thereon. A rotary sweep 15 timed with the hopper is adapted to receive the balls 11 between its arms and to propel them intermittently upon the table surface 13 to deliver them in timed succession onto the pan 16 of a weighing device 17 and to push each ball from the pan and into a discharge chute 18 as it brings the next ball onto the pan. The chute 18 is connected, through an elbow chute 19, with an inclined race-way 20 having a series of hinged lifting doors 21, 21 mounted in openings 22, 22 formed in its floor, automatic means being provided for momentarily opening one or another of the doors, according to the registered weight of the approaching ball, to permit the latter to drop through the floor of the race-way and be received by the proper one of a series of receptacles placed below the respective openings 22.

The means for selectively opening the doors 21 comprises a liquid-cell contactor 23 composed of dielectric material such as hard rubber and formed with an elongated cell 24 (Fig. 2) and with a series of short cells 25, 25 ranged along the elongated cell and separated therefrom by a wall 26 and from each other by walls 27, 27. The said cells are partially filled with mercury and means is provided for periodically lifting and lowering the contactor, in timed relation to the mounting of the successive balls upon the weighing pan 16 and their removal therefrom, to cause the mercury in the elongated cell 24 and that in one or another of the shorter cells 25 to make and break contact with the respective arms of 28, 29 of a forked indicator 30 constituting a part of the weighing device 17, and thereby to close and open one or another of respective electric circuits in which are mounted electromagnets 31, 31 adapted to control the opening of the respective doors 21.

*Hopper structure.*

Figure 7:
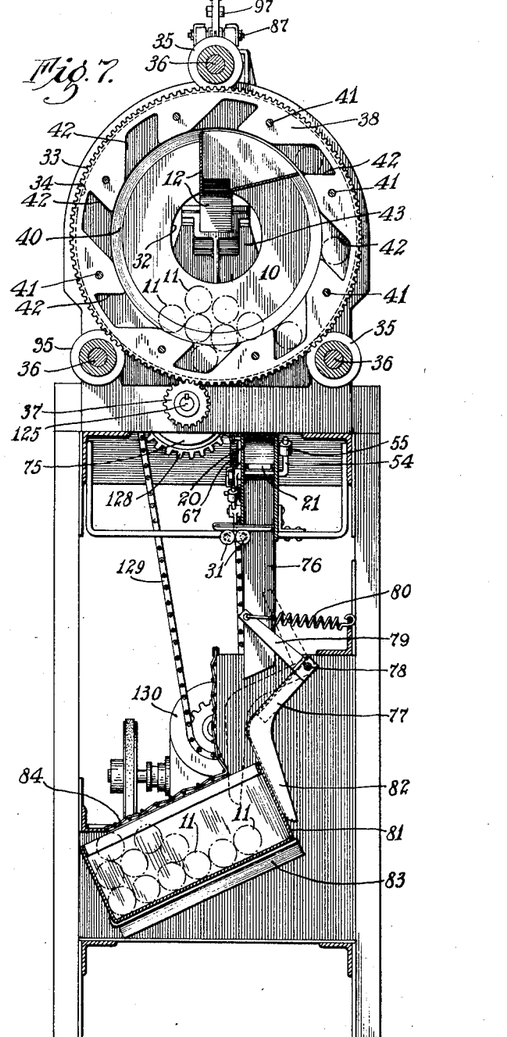
Fig. 7 is a vertical, transverse section on line 7—7 of Figs. 1 or 2.
Figure 8:
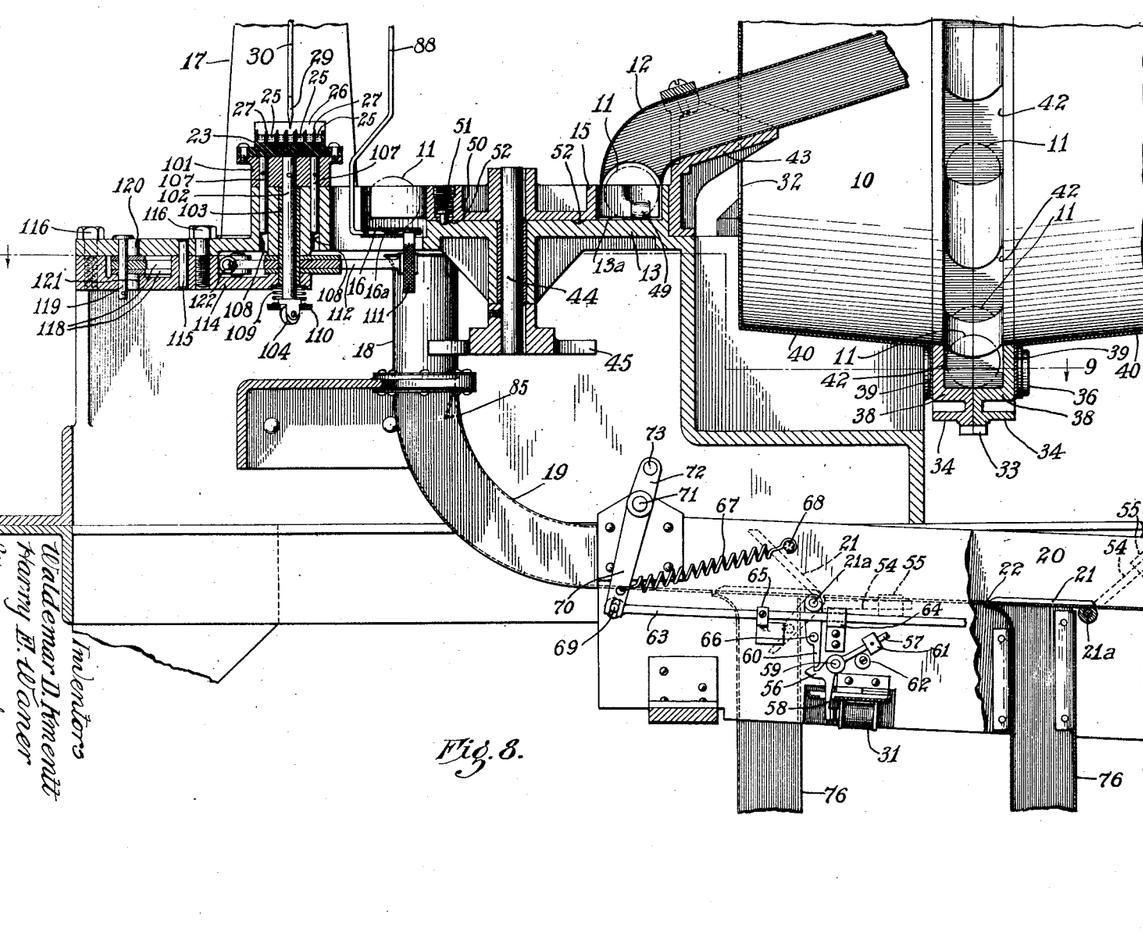
Fig. 8 is a vertical section on line 8—8 of Fig. 2.

The hopper 10 is substantially barrel shaped, is formed with axial openings in its end walls, such as that shown at 32 in Fig. 8, and is provided at its middle with a sectional ring-gear 33 flanked by bearing surfaces 34, 34 by which it is peripherally journaled within a set of three spool-shaped idler rollers 35, 35, said rollers being journaled upon stub shafts 36, 36 projecting from the framing of the machine. The ring gear 33, meshed with a pinion 37 for driving the hopper, is formed in two axially abutted halves, as will be seen clearly in Figs. 7 and 8, each half of the gear ring and the adjacent bearing portion 34 being formed integrally with a ring 38 constituting a part of the wall of the hopper, the two rings 38 being clamped together between out-turned flanges 39, 39 formed upon the adjacent margins of the respective end portions 40, 40 of the hopper (Fig. 8), by bolts 41, 41.

The two rings 38 are so formed as to provide obliquely disposed pockets 42, 42, on the inner face of their combined structure, said pockets being open to the interior of the hopper and having their mouths approximately flush with the inner surfaces of the members 40 of the hopper. Each of the pockets is adapted to receive one of the balls 11, but only one, from a supply of the same within the hopper, as the hopper is rotated counter-clock-wise as viewed in Fig. 7, to carry the ball upward to the mouth of the chute 12, and to permit the ball to roll by gravity from the pocket into the chute 12 when it has risen above the level of the latter, as will be readily understood upon reference to Fig. 7, the chute 12 being stationarily mounted upon a bracket 43 and having a flared receiving-end portion within the hopper 10.

*Scale-loading device.*

The rotary sweep 15, for propelling the balls upon the table surface 13ª from the delivery end of the chute 12 to the pan 16 of the weighing device, is secured upon the upper end of a vertical shaft 44 journaled in the framing of the machine and having secured upon its lower end, below the bearing, a star-wheel 45 adapted to be intermittently driven by a stud-roller 46 mounted upon the end of an arm 47 which is secured to a vertical shaft 48 journaled in the machine framing. Each of the arms of the sweep 15 has an anti-friction roller 49 journaled thereon in position to engage the ball 11 to propel it over the table surface 13. To prevent over-running of the sweep 15 a plunger 50 (Fig. 8), backed by a spring 51, is mounted in one arm of the sweep and is adapted to enter one of a series of depressions 52 in the table surface 13ª at the end of each rotative movement, and to be dislodged therefrom by the succeeding forced movement of the sweep.

At a point on the delivery side of the scale pan 16 the table 13 is formed with an opening 53 adapted to permit the successive balls to drop therethrough into the chute 18, which is mounted upon the framing below the table 13, as clearly shown in Figs. 8 and 9.

*Sorting devices.*

Figure 2:
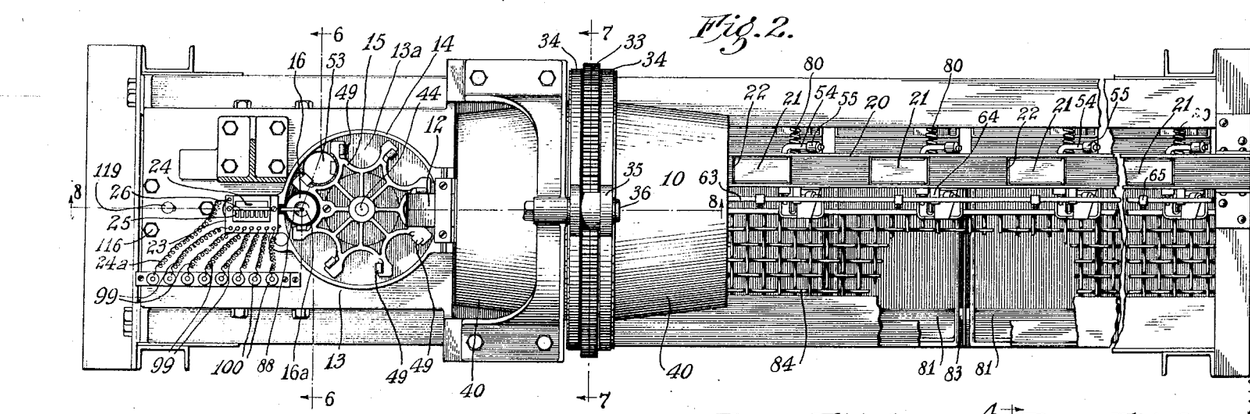
Fig. 2 is a plan view of the same, with parts sectioned and parts broken away.
Figure 3:
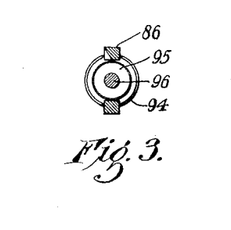
Fig. 3 is a vertical section on line 3—3 of Fig. 1.
Figure 4:
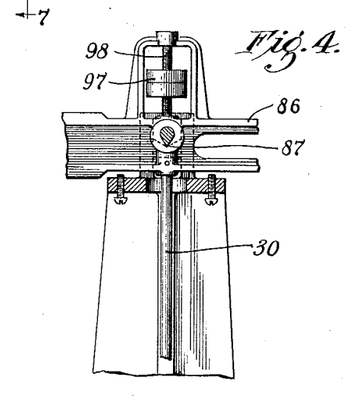
Fig. 4 is a vertical section on line 4—4 of Fig. 5.
Figure 5:
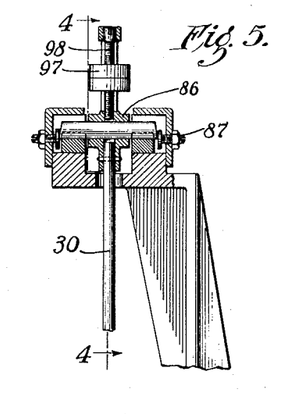
Fig. 5 is a vertical section on line 5—5 of Fig. 1.

Each of the doors 21 is provided with an arm 54 projecting laterally from its hinge-pin 21ª and having adjustably mounted thereon a counter-weight 55 adapted to urge the door toward its lifted or open position (see Figs. 2 and 8). For latching the door in closed position, against the force of the counter-weight 55, a three armed lever, having arms 56, 57 and 58, is fulcrumed upon a stub shaft 59 projecting from a downwardly extended side wall of the race-way 20, the arm 56 being formed as a cam-latch detent and adapted to engage an arm 60 secured upon the adjacent end of the hinge-pin 21ª of the door 21. The arm 57 has adjustably mounted thereon a counter-weight 61 adapted to urge the lever toward latching position, and the arm 58 has its lower end in position to be attracted by the electromagnet 31 to unlatch the arm 60 and thus permit the door 21 to be opened by the counter-weight 55. An eccentric stop 62 (Fig. 8) is adjustably secured to the wall of the race-way 20 in position to keep the arm 58 close enough to the electromagnet 31 to be actuated thereby.

For closing such door as has been opened for the reception of the ball after each weighing operation, a bar 63 is slidably mounted in brackets 64, 64 secured to the side of the race-way and has secured thereon adjacent each of the doors 21 a cam plate 65 adapted to co-act with a stud 66 projecting from the arm 60 to limit the opening of the door 21 and to return the arm 60 to its latched position, the bar 63 being urged toward latching position, to the right as viewed in Fig. 8, by a pull spring 67 (Fig. 8) connecting its actuating lever with a stud 68 projecting from the race-way structure 20.

Figure 1:
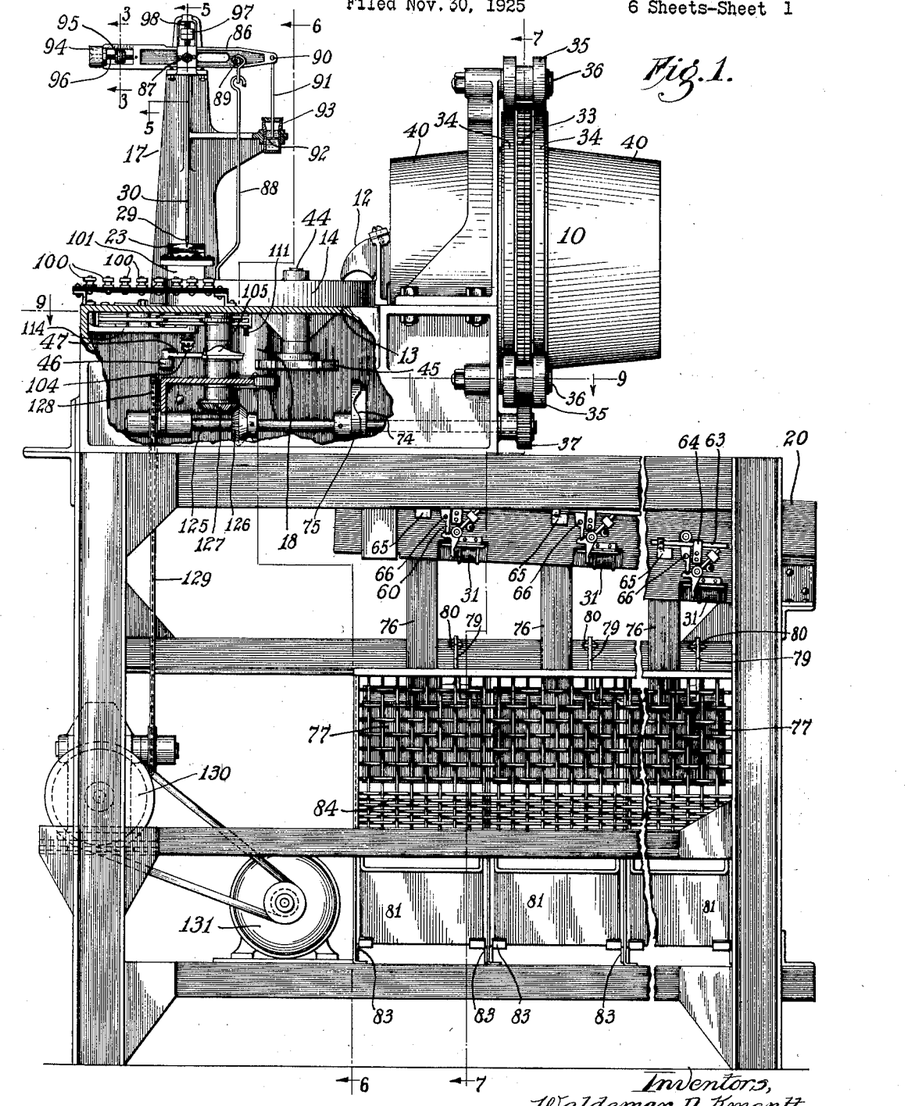
Fig. 1 is a side elevation of our preferred embodiment of the invention as applied to the weighing and sorting of spherical objects or balls such as golf-ball centers, parts being sectioned and parts being broken away.
Figure 9:
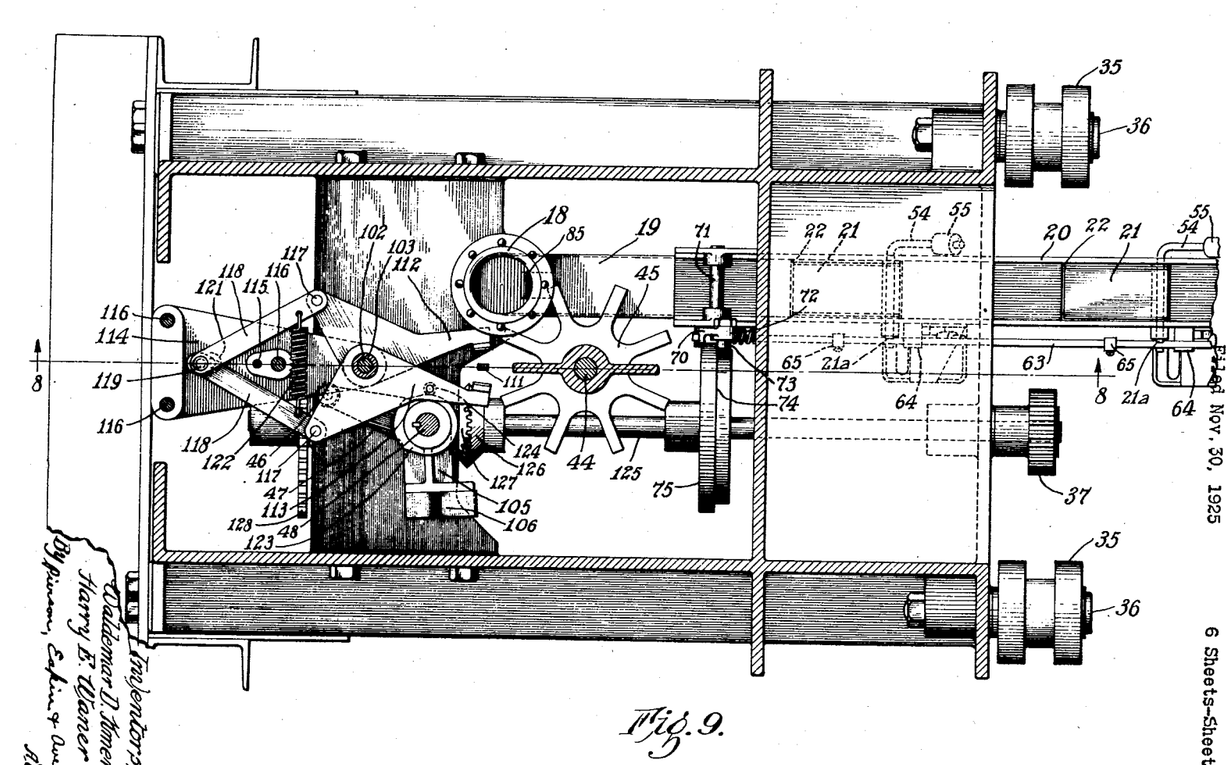
Fig. 9 is a horizontal section on line 9—9 of Fig. 1 or 8.
Figure 10:
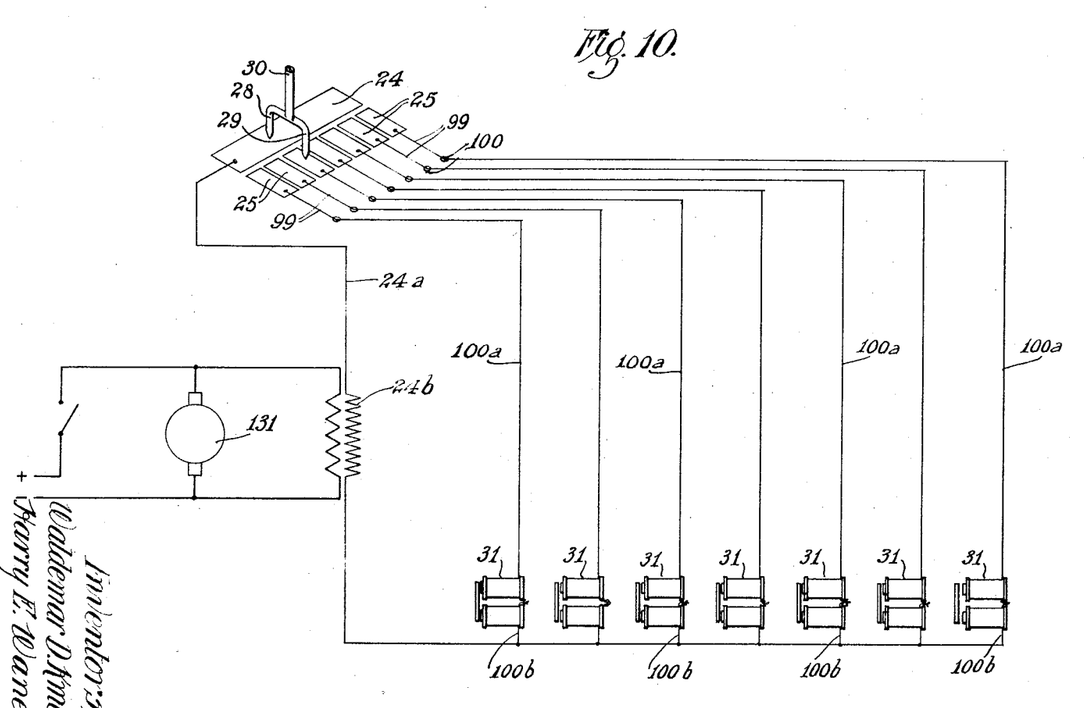
Fig. 10 is a diagram of the electric wiring.

For pulling the bar 63 in the opposite direction, to withdraw the several cam plates 65 simultaneously from their studs 66, and thus permit any one or another of the doors 21 to be opened, the end of the bar 63 adjacent the chute 19 is provided with a pin 69 straddled by the forked lower end of an arm 70 of a two-armed lever which is fulcrumed upon the structure of the race-way 20 at 71 and has its other arm 72 provided with a cam stud 73 which is held by the force of the spring 67 against a cam face 74 formed upon a cam disk 75 (see Figs. 1 and 9).

Under each of the doors 21 is a downwardly projecting chute or spout 76 mounted upon the structure of the race-way 20 and adjacent the lower end of the chute a gate 77

(Fig. 7) is pivoted at 78 upon the framing. Projecting laterally from the gate adjacent its pivot is an arm 79 connected with the framing by a pull spring 80 adapted to urge the gate into closed position with relation to the lower end or mouth of the spout 76, to cause the balls to accumulate in the spout at such times as a receptacle 81, normally mounted in position to receive balls from the spout, is removed from the machine, as in emptying it of balls. The gate 77 is formed at its outer end with a lateral extension 82 adapted to be engaged by the container 81, when the latter is slid into place upon its supporting rails, 83, 83, to open the gate against the force of the spring 80, to permit the balls to fall from the spout 76 into the container. A guard 84 of wire netting or the like is mounted in a position to direct the balls into the container and to prevent their bounding therefrom.

The elbow chute 19 may be provided with an internal baffle 85, as shown in Fig. 8, to cause successive balls to assume the same position in the chute at that point and thus to avoid such non-uniformity in the speed of the balls from that point onward as would otherwise sometimes result from some of the balls bounding from side to side of the chute.

Weighing device.

The weighing device 17 comprises a scale beam 86 fulcrumed at 87, to which the downwardly projecting indicator 30 is secured in a radial position with respect to the fulcrum 87. The pan 16 is formed with a central depression 16$^a$ and is supported by a goose-neck rod 88 which hangs from a knife-edge support 89 upon one arm of the scale beam, and this arm also has pivoted thereon at 90 a downwardly extending rod 91 having upon its lower end a piston-like, perforated baffle-plate 92, mounted in a dash pot 93 which is secured in the frame of the machine, for damping oscillations of the scale beam.

The other arm of the scale beam has a weight 94 fixed thereon, and an adjustable weight 95 mounted upon a screw 96, the latter being disposed lengthwise of the beam and fixed in an opening therein, for so balancing the scale by adjustment of the weight 95 as to cause the indicator 30 to stand in a determinate, approximately vertical position, with its lower end directly over the middle of one of the small cells 25, when a test weight serving as a standard is mounted in the scale pan 16, the downwardly extending indicator 30 causing the center of gravity of the scale beam assembly to be below the fulcrum 87.

For raising and lowering the center of gravity in order to obtain a determinate desired displacement of the indicator 30, coordinated with the lengths of the cells 25, for a given under-weight or over-weight upon the scale pan, an adjusting weight 97 is mounted upon a screw 98 which is fixed in an arch-like projection extending from the scale beam, the screw 98 being opposite to the indicator 30 and disposed radially with relation to the fulcrum 87, so that adjustments of the weight 97 will merely raise or lower the center of gravity of the assembly, without affecting the balance or loading which is obtained by means of the weights 94 and 95.

The elongated cell 24 of the mercury container 23 is provided with a suitable connection 24$^a$ for maintaining electrical connection between the mercury in the cell 24 and a suitable source of current, such as a transformer 24$^b$ associated with the power line of the motor 131, and suitable means including connectors 99, 99, binding posts 100, 100, and connectors 100$^a$, 100$^a$ and 100$^b$, 100$^b$ are provided to complete respective circuits through the small cells 25 and the respective electromagnets 31, so that a circuit will be closed through one or another of the said electromagnets whenever the lifting of the mercury container 23 causes the forked end of the indicator 30 to connect the mercury in the elongated cell 24 with the mercury in one or another of the short cells 25. The arm 29 of the indicator is pointed and the upper edges of the partitions 27 between the cells 25 are beveled, so as to insure entry of the arm into the cells.

Figure 6:
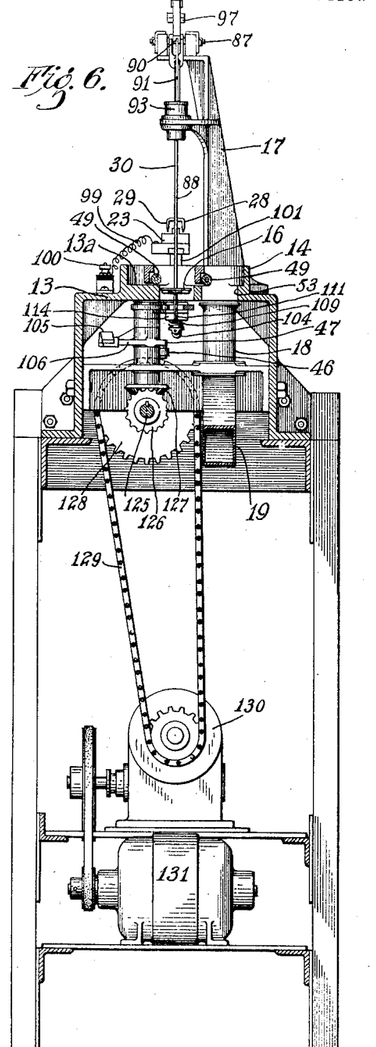
Fig. 6 is a vertical, transverse section on line 6—6 of Figs. 1 or 2.

For lifting the mercury container 23 at proper times in the operation of the machine, said container is mounted upon a head 101 (see Fig. 8) which is secured upon the upper end of a push-rod or stem 102 slidably extending downward through a bushing 103 mounted in the framing of the machine, said stem having journaled upon its lower end a cam roller 104 adapted to be engaged and to be lifted and lowered by a cam 105 mounted upon an arm 106 (Figs. 6 and 9) projecting horizontally from the shaft 48. The head 101 (Fig. 8) has a pair of guide pins 107, 107 secured thereto and projecting downward with a sliding fit into respective guide apertures 108, 108 formed in the frame-casting 13, to prevent rotation of the head 101 and the mercury container 23 thereon as the latter are raised and lowered. A compression spring 109 (Fig. 8) is mounted between the bearing of the stem 102 and a plate 110 secured to the lower end of the stem, to urge the mercury container toward its lowermost position, where it is stopped by contact of the head 101 with the frame-casting upon which it is mounted, as the cam 105 passes from under the roller 104.

For holding the scale pan 16 steady while one ball 11 is shoved therefrom and another is mounted thereon by the sweep 15, the pan has secured thereto a downwardly projecting knurled stem 111 (see especially Figs. 8 and 9) adapted to be grasped at appropriate times by a pair of gripper jaws 112, 113, constituting an intermittent stabilizer for the pan. These jaws are fulcrumed upon the bushing 103 between the frame-casting and a bracket 114 (see Fig. 8) secured thereto by dowels such as that shown at 115 and by screw bolts 116, 116. To compel the jaws 112, 113 to close equally from opposite sides upon the stem 111 of the scale pan, and thus hold it in a determinate, central position, the jaws are provided with extensions rearward of their hinge, these extensions having pivoted thereon at 117, 117 respective toggle arms 118, 118, which are hinged together at their other ends by a pin 119 which extends through slots 120, 121 formed in the frame-casting and in the bracket 114 respectively, the slots being so formed as to permit opening and closing of the jaws while compelling them to move equally from and toward a central position. For urging the jaws toward opened position the toggle arms 118 are connected by a pull spring 122, and for closing them, against the force of the spring, a cam 123 is mounted upon the shaft 48 and adapted to coact with a cam roller 124 (Fig. 9) mounted upon the under-face of the jaw 113.

Driving mechanism.

The driving mechanism for the parts described comprises a horizontal shaft 125, upon which the cam disk 75 and the pinion 37 are secured, said shaft having secured thereon a beveled gear 126 meshed with a beveled gear 127 secured upon the lower end of the shaft 48. A sprocket wheel 128 secured upon the shaft 125 is connected through a sprocket chain 129 and a reduction gear 130 with a motor 131. The hopper 10, the sweep 15, the contactor 23, the grippers 112, 113 and the doors 21 are all thus adapted to be actuated in determinate, timed relation.

Operation.

In the operation of the machine, the shafts 125 and 48 being continuously driven by the motor 131, a supply of the balls 11 are placed in the hopper 10 through the opening in the end wall thereof farthest from the weighing device. As the hopper 10 rotates the pockets 42 pass in succession under the supply of balls and each pocket receives one of the balls therein, as is shown clearly in Fig. 7, and by reason of the oblique position of the pocket the ball is retained therein until it is lifted to the upper part of the orbit of the hopper and there rolls from the pocket into the chute 12, through which it descends by gravity onto the table surface 13$^a$, the balls thus being caused to arrive upon the table surface in timed succession, and the timing of the sweep 15 being such as to position it to receive the successive balls in the successive spaces between its arms.

At each stepping forward of the sweep 15, one of its arms sweeps past the scale pan 16 to remove therefrom any ball that may be occupying the pan and to discharge it through the chute 18, while the following arm of the sweep propels the succeeding ball onto the pan. The indexing of the sweep 15 at the end of each movement is such as to hold its adjacent arms out of contact with the ball on the scale pan, the ball automatically settling into the depression 16$^a$ of the scale pan when it is propelled onto the latter and thus moving slightly ahead of the propelling arm of the sweep, as will be clear upon reference to Fig. 2.

The grippers 112, 113, timed by the cam 123, grasp the stem 111 of the scale pan and hold the latter stationary throughout the indexing movement of the sweep 15 which dislodges one ball from the scale pan and mounts another thereon. The grippers then release the scale pan for the weighing operation, permitting the indicator 30 to assume a position determined by the weight of the ball, whereupon the cam 106, engaging the roller 104, thus momentarily lifts and then lowers the contactor 23 and thereby closes a circuit through the cell 24 and such one of the cells 25 as is directly beneath the indicator. Such closing of the circuit actuates the corresponding electromagnet 31 and causes that one of the doors 21 to be opened which is controlled by the cell 25 through which the circuit is closed, the face 74 of the cam disk 75 having forced the bar 63 to the left as viewed in Fig. 8, to permit the opening of the door 21. The next succeeding movement of the sweep 15 dispatches the ball 11 through the chute structure 18, 19 into the runway 20, where it falls through the particular opening 22 which has been uncovered and drops through the adjacent spout 76 into the receptacle 81 thereunder, except when the receptacle 81 is not in place. At such times the absence of the receptacle permits the spring 80 to hold the gate 77 in position to close the bottom end of the spout 76, so that the balls accumulate in the latter until the gate 77 is re-opened by replacement of the receptacle.

At a time after the discharge of the ball 11 from the scale pan sufficient to permit the ball to travel the whole length of the runway 20, as in case the farthest of the doors is the one that is opened, the cam face 74 permits the spring 67 to actuate the bar 63 to close and latch such one of the doors 21 as has been opened for the reception of the ball.

This cycle as just described is continuously repeated, additional balls being poured into the hopper 10 and removed from the receptacles 81 while the machine continues to operate, and the numerous advantages expressed and implied in the above statements of objects are thus obtained.

Our invention is susceptible of various modifications within its scope and we do not wholly limit our claims to the specific construction herein shown and described by way of illustration.

We claim:

1. Classifying apparatus comprising a metric device including a pivoted registering part adapted to assume different positions about its pivot in accordance with the character of different articles mounted in the device and without contact except at its pivot, feeler means mounted for movement into coaction with said part after the latter has assumed its registering position and from a direction transverse to the registering movement of said part, and means controlled by said feeler means for sorting the successive articles passing from the said metric device, the said feeler means comprising a pair of electric contact members insulated from each other but adapted to be connected in circuit by contact with the said registering part.

2. Classifying apparatus comprising a metric device including a registering part adapted to assume different positions in accordance with the character of different articles mounted in the device, feeler means mounted for movement into coaction with said part after the latter has assumed its registering position and from a direction transverse to the registering movement of said part, and means controlled by said feeler means for sorting the successive articles passing from the said metric device, the said feeler means comprising a set of liquid-containing electric contact cells and a contact member adapted to make electric connection with the liquid contents of the said cells selectively upon the movement of the feeler means into association with the registering part.

3. Apparatus as defined in claim 2 in which one of the cells extends along a plurality of the other cells and in which the contact member is forked and is thus adapted to connect the first mentioned cell with the other cells selectively.

4. Classifying apparatus comprising a pivoted weigher structure having a registering part adapted to be swung against gravity to different positions according to the weight of successive articles weighed, a weight mounted upon the said structure for such adjustment as to raise and lower the center of gravity of the assembly, feeler means mounted for movement into coaction with said registering part from a direction transverse to the latter's registering movement, and means controlled by the said feeler means for sorting successive weighed articles passing from the said weigher structure.

5. Classifying apparatus comprising a pendent scale pan, means for mounting successive articles upon and removing them from the said scale pan, and means timed therewith for intermittently holding the said scale pan against oscillation.

6. Apparatus as defined in claim 5 in which the pan-holding means comprises a pair of gripper members mounted to grip a part of the scale pan structure to hold the pan in central position, and each to be removed from its pan-holding position in each cycle of operation.

In witness whereof we have hereunto set our hands this 29th day of October, 1925.

WALDEMAR D. KMENTT.
HARRY E. WANER.